(12) United States Patent
Peter

(10) Patent No.: US 10,399,511 B2
(45) Date of Patent: Sep. 3, 2019

(54) TOOL BOX LIFT FOR TRUCKS AND OTHER VEHICLES

(71) Applicant: Bertha Manufacturing, LLC, Hicksville, OH (US)

(72) Inventor: Jeffrey J. Peter, Hicksville, OH (US)

(73) Assignee: Bertha Manufacturing, LLC, Hicksville, OH (US)

( * ) Notice: Subject to any disclaimer, the term of this patent is extended or adjusted under 35 U.S.C. 154(b) by 0 days.

(21) Appl. No.: 16/044,604

(22) Filed: Jul. 25, 2018

(65) Prior Publication Data
US 2019/0039532 A1 Feb. 7, 2019

Related U.S. Application Data

(60) Provisional application No. 62/536,873, filed on Jul. 25, 2017.

(51) Int. Cl.
| | |
|---|---|
| *B60R 9/06* | (2006.01) |
| *B60R 11/06* | (2006.01) |
| *B60R 3/02* | (2006.01) |
| *B66F 7/06* | (2006.01) |
| *B66F 3/22* | (2006.01) |
| *B60R 11/00* | (2006.01) |

(52) U.S. Cl.
CPC ............. *B60R 11/06* (2013.01); *B60R 3/02* (2013.01); *B60R 9/06* (2013.01); *B66F 3/22* (2013.01); *B60R 9/065* (2013.01); *B60R 2011/004* (2013.01); *B60R 2011/0084* (2013.01); *B60R 2011/0085* (2013.01); *B60R 2011/0092* (2013.01); *B66F 7/065* (2013.01)

(58) Field of Classification Search
CPC .......... B60R 9/065; B60R 9/06; B60R 11/06; B60R 2011/0084; B60R 2011/0085; B60R 3/02; B60R 3/22; B66F 7/065
See application file for complete search history.

(56) References Cited

U.S. PATENT DOCUMENTS

| | | | | |
|---|---|---|---|---|
| 4,936,624 A * | 6/1990 | West | ....................... | B25H 3/021 |
| | | | | 224/282 |
| 6,386,409 B1 * | 5/2002 | Cheney | ..................... | B60R 9/00 |
| | | | | 220/525 |
| 6,626,479 B1 * | 9/2003 | Skoug | ........................ | B60R 9/00 |
| | | | | 224/404 |
| 6,942,271 B1 * | 9/2005 | Jamison | ................... | B60R 3/007 |
| | | | | 14/71.1 |
| 7,182,177 B1 * | 2/2007 | Simnacher | ................ | B66F 3/12 |
| | | | | 187/211 |
| 7,464,978 B1 * | 12/2008 | Meeks | ...................... | B25H 1/00 |
| | | | | 108/44 |
| 7,726,719 B1 * | 6/2010 | Barron | ..................... | B60R 9/065 |
| | | | | 224/404 |
| 8,033,435 B1 * | 10/2011 | Brooke | ................... | B60R 9/065 |
| | | | | 108/167 |
| 8,393,665 B2 * | 3/2013 | Villano | ................... | B60R 11/06 |
| | | | | 224/403 |

(Continued)

*Primary Examiner* — Justin M Larson
(74) *Attorney, Agent, or Firm* — Kevin R. Erdman; Brannon Sowers & Cracraft PC

(57) ABSTRACT

The present invention involves a tool support assembly with a lifting mechanism and a lateral extension mechanism. The assembly is configured to be located in a walled bed such as a pickup truck bed, and extend the tool box above and beyond the wall.

11 Claims, 8 Drawing Sheets

(56) References Cited

U.S. PATENT DOCUMENTS

| | | | | |
|---|---|---|---|---|
| 8,636,182 B1* | 1/2014 | Gordon | B60R 9/00 | 224/282 |
| 9,481,403 B1* | 11/2016 | Johnson | B62D 33/023 | |
| 9,862,333 B1* | 1/2018 | Jones | B60R 11/06 | |
| 9,963,081 B1* | 5/2018 | Taylor | B66F 7/0608 | |
| 10,160,368 B2* | 12/2018 | Keck | B60P 1/43 | |
| 2007/0176389 A1* | 8/2007 | VanBelle | B60R 3/02 | 280/166 |
| 2008/0106111 A1* | 5/2008 | Pritchard | B60R 3/02 | 296/62 |
| 2010/0025955 A1* | 2/2010 | Carr, Jr. | B60R 3/02 | 280/166 |
| 2011/0037286 A1* | 2/2011 | Nebel | B60R 9/00 | 296/37.6 |
| 2011/0284602 A1* | 11/2011 | Lamouroux | B60R 11/06 | 224/402 |
| 2012/0200106 A1* | 8/2012 | Villano | B60R 9/065 | 296/37.6 |
| 2016/0368542 A1* | 12/2016 | Taylor | B66F 7/28 | |
| 2019/0039532 A1* | 2/2019 | Peter | B60R 11/06 | |

\* cited by examiner

TOOL BOX LIFT FOR TRUCKS AND OTHER VEHICLES

The present application is a nonprovisional application claiming priority under 35 U.S.C. § 119(e) to U.S. Provisional Patent Application Ser. No. 62/536,873, filed Jul. 25, 2017, the disclosures of which are herein incorporated by reference.

BACKGROUND

Tool storage chests or boxes are a popular accessory for pickup trucks and other work vehicles having flat beds. Such boxes allow for the storage and securing of commonly used tools from job site to job site. Popular varieties of such tool boxes include basic chests 20 such as shown in FIG. 1 and saddle-type chests 30 as shown in FIG. 2 which span the width of the truck's bed 24 and may or may not partially rest on the sidewalls 26, 28 of the truck bed. Typical truck bed tool boxes may be simple boxes with a locking lid suitable for storing larger tools loosely therein or they may be more elaborate with separate internal storage trays and/or compartments with multiple locking draws and/or lids.

One disadvantage of such tool boxes is that they are typically stored near the front (cab) portion of the truck bed so as to allow for the use of the remaining portion of the bed for storage. This makes the tool box inaccessible to a user unless they first climb into the bed of the truck given the typical height of a pickup or work truck bed. Having to climb in and out of a typical truck bed is inconvenient at best, and can be tiring if repeated trips are necessary and potentially hazardous if working conditions are wet or slippery. What is needed is a way to access a truck bed tool box without having to climb into the truck bed.

SUMMARY

The invention relates to an arrangement of a tool box support for accessing tool box contents stored in the tool box initially deployed in a pickup truck bed that allows access to those contents from outside of a pickup truck bed. The inventive mechanism both lifts the tool box upwards and laterally displaces the tool box from the truck bed walls so that the contents of the tool box may be accessed from outside of the truck.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
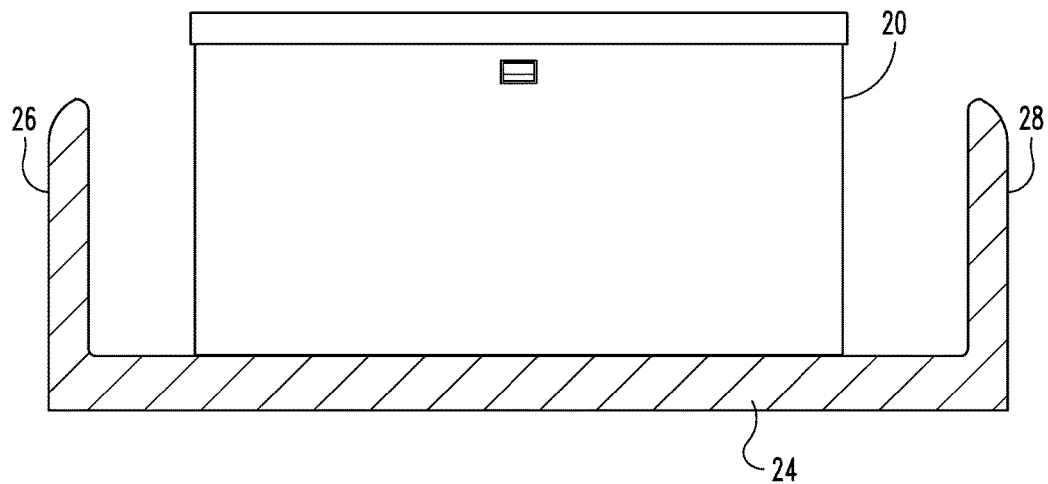
FIG. 1 is a partial cut away view of an example of a truck bed tool box as known in the industry.
Figure 2:
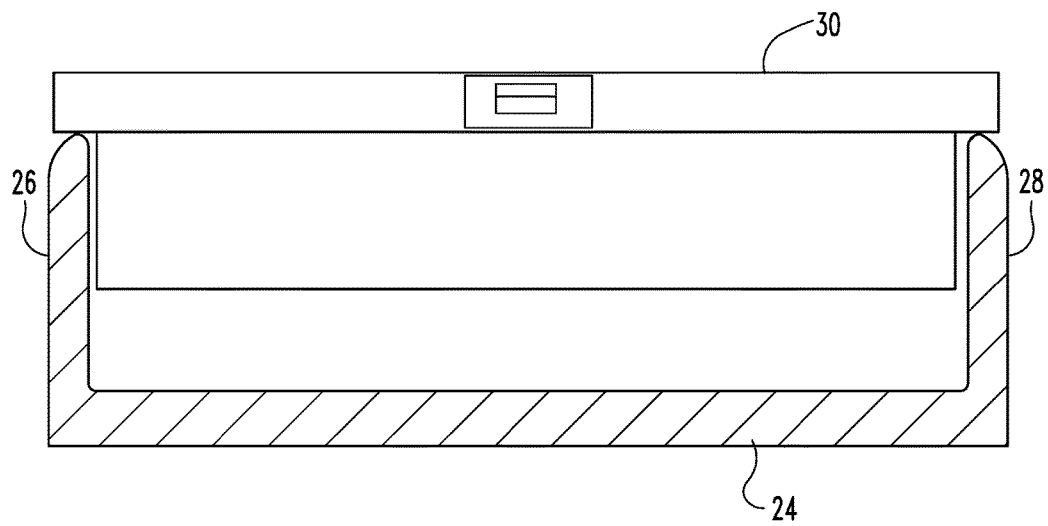
FIG. 2 is a partial cut away view of another example of a truck bed tool box as known in the industry.
Figure 3:
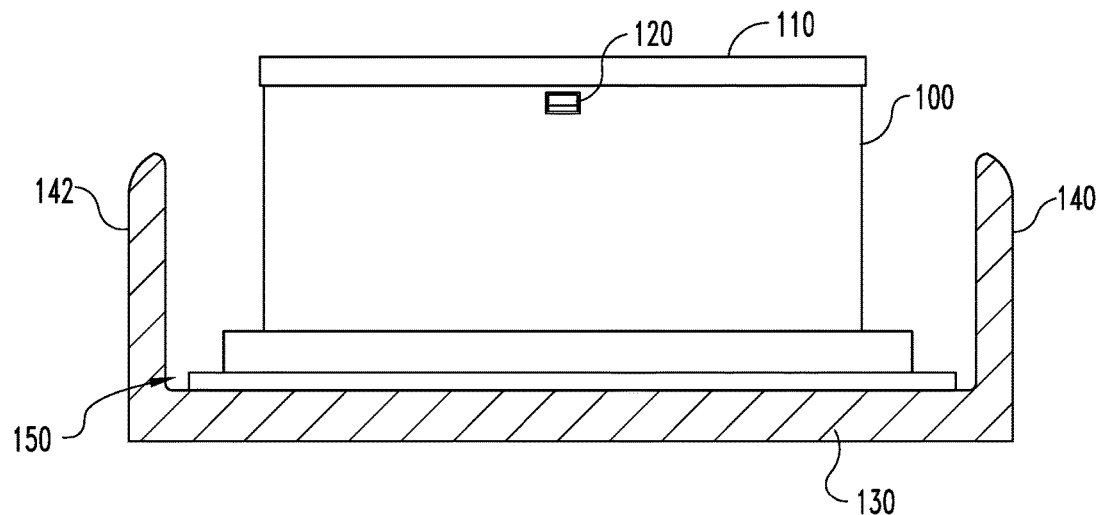
FIG. 3 is a partial cut away view of a truck bed tool box according to an example of the disclosed technology.
Figure 4:
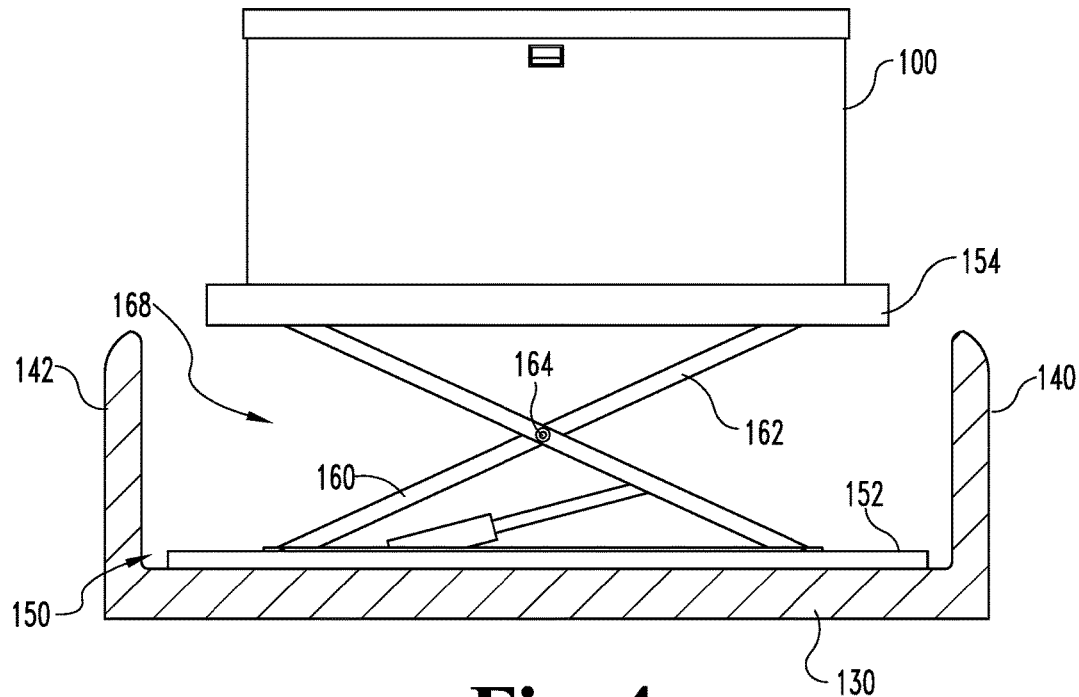
FIG. 4 shows the tool box of FIG. 3 in a raised position.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

One example of a tool box according to the disclosed technology is shown in FIGS. 3-6. In this example, tool box 100 is stowed in bed 130 of a truck having sides 140, 142. The tool box may be of a variety of designs and configurations as desired, but in this example it is depicted as a tool box having lid 110 and locking latch 120 which secures lid 110 in the closed position. The specific tools within tool box 100 may be ordinary construction tools (e.g., hammers and screwdrivers), automobile tools (e.g., wrenches and rackets), or other tool types as is contemplated by the present invention. Truck bed 130 is depicted as a typical pickup truck bed, but the disclosed technology may be adapted to other types of truck beds such as stake sided beds, flat beds, and the like. Additionally, the disclosed technology may be adapted for use in trailers, wagons, and other vehicles where tool boxes are typically stored. Tool box 100 is secured to deployment mechanism 150 which mounted to the bed of truck 130 using bolts, welds, straps, hooks, or other suitable arrangements (for example without limitation, having a base structure of sufficient weight to render deployment mechanism 150 immobile).

Figure 5:
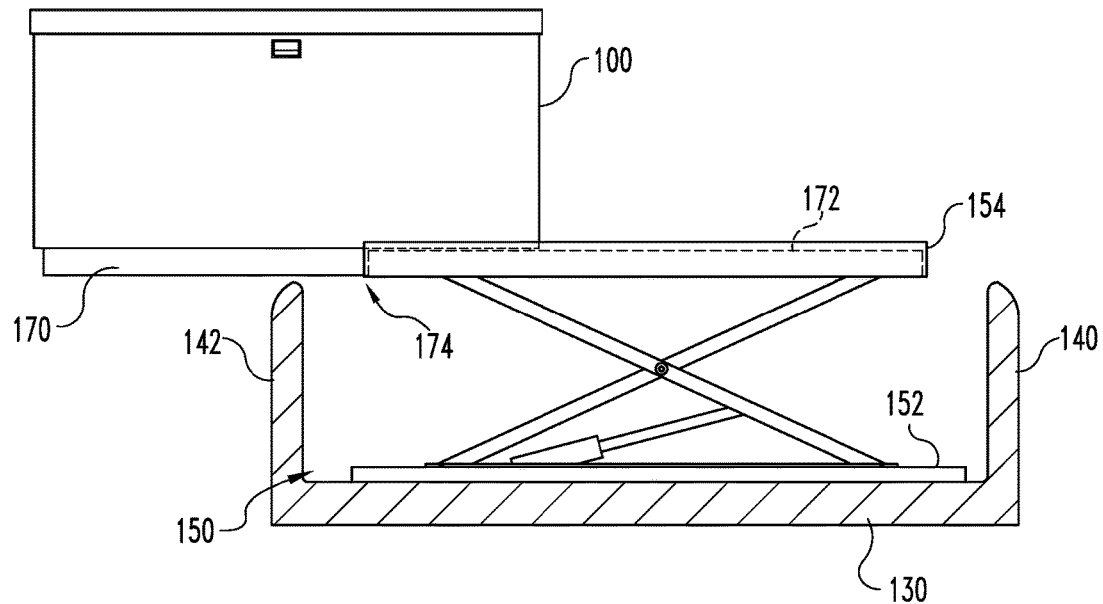
FIG. 5 shows the tool box of FIG. 3 in a partially deployed position.
Figure 6:
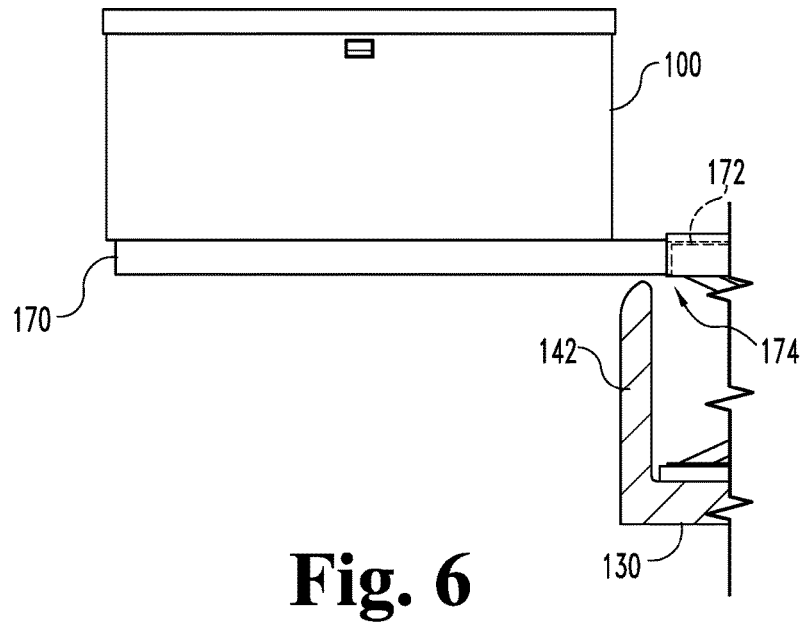
FIG. 6 shows the tool box of FIG. 3 in a deployed position.

Deployment mechanism 150 is capable of lifting tool box 100 (FIG. 4) as well as laterally deploying tool box 100 (FIGS. 5-6). In this example, deployment mechanism 150 includes scissor-lift mechanism 168 for lifting tool box 100 above truck sides 140, 142. Lift mechanism 168 includes top frame 154 secured to tool box 100 (either directly to the base of tool box 100, or a base of top frame 154 secured to tool box 100), bottom frame 152 secured to truck bed 130, and two or more cross members 160, 162 which act to lift tool box 100 by moving top frame 154 away from bottom frame 152. In this example, the cross members are pivotably secured to one another by pin or bolt 164. Lifting mechanism 168 may be powered using an electrical motor, hydraulics, pneumatics, manually, or any other suitable power source. Optionally, lifting mechanism 168 may include a screw-type mechanism or other suitable mechanisms for improving performance. In some embodiments, lifting mechanism may be driven by an electric motor disposed within mechanism 168, while in other embodiments a fluid such as air or hydraulics may be used to provide the motive force. A control for the lifting mechanism may be disposed within the truck, and alternatively or in combination a wireless remote control may be implemented.

Deployment mechanism 150 further includes one or more lateral slides 174 operably connected to top frame 154. Once tool box 100 is lifted to the desired height tool box 100 may slide out laterally on the one or more lateral slides 174 either partially (FIG. 5) or completely (FIG. 6) as desired. The lateral slide includes lower slide bracket 172 mounted to top frame 154 and upper slide bracket 170 mounted to the base of tool box 100. Optionally, top frame 154 and/or upper slide bracket 170 may include bracing, reinforcing members, and/or counterweights to help prevent deployment mechanism 150 from putting undue stress on the truck floor and/or bending or damaging deployment mechanism 150 or lateral slides 174. Optionally, the top of truck side 142 may include a bracket, guide, or other members for engaging and supporting lateral slides 174 to help support deployment mechanism 150 when tool box 100 is deployed.

In some embodiments, lateral slides 174 may be made of an elastomer material that allows for mutual movement of upper slide bracket 170 and lower slide bracket 172. In other embodiments, wheels (see FIG. 13) are disposed on one or both of upper slide bracket 170 and lower slide bracket 172, such wheels may be fashioned from hard rubber, elastomers, or metals such as aluminum or solid steel.

Figure 7:
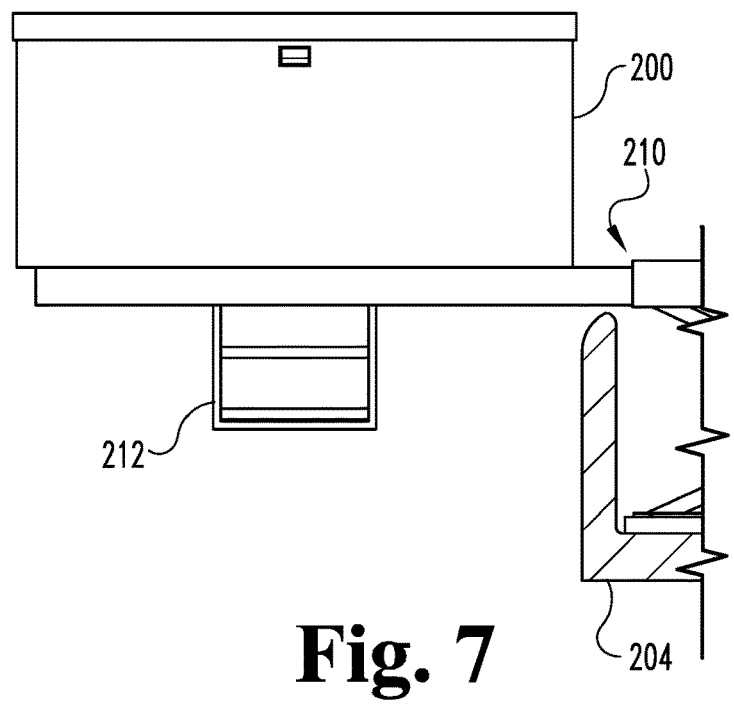
FIG. 7 shows an example of a tool box having steps according to the disclosed technology in the deployed position.

In many applications of the disclosed technology, once a tool box is deployed it will be at or above the level of the truck bed sides which will typically be well above a useful working height. In the example shown in FIG. 7, tool box 200 is shown in the deployed position outside of truck bed 204. One or more folding steps 212 are mounted to the underside of tool box 200 so as not to interfere with the operation of deployment mechanism 210 as shown in the deployed position. More or fewer steps may be used as necessary to allow for a typical user to easily step up and access the tool box in the deployed position. When finished, the user (not shown in the Figures) may simply fold up the steps so they are stowed under tool box 200 and reposition the box in the truck bed for transport.

Figure 8:
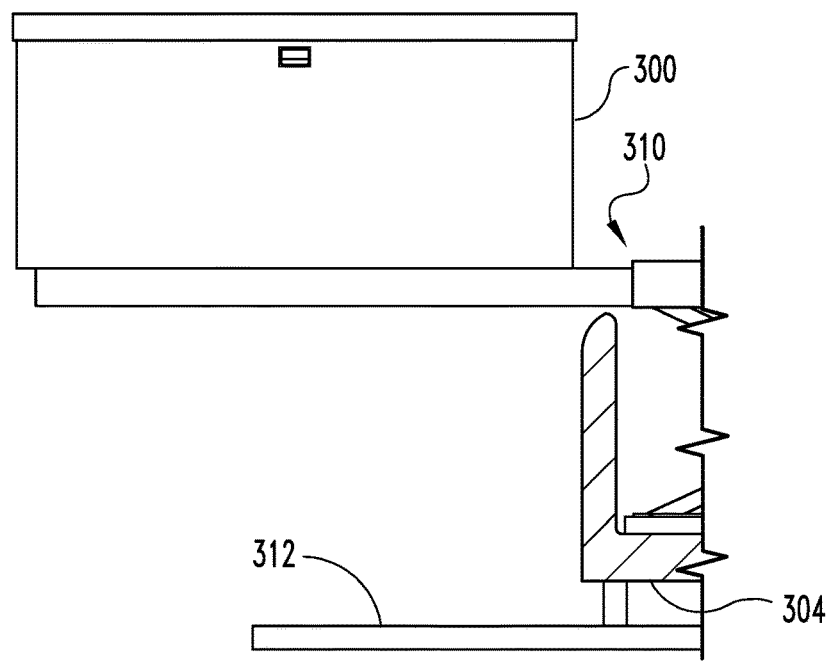
FIG. 8 shows an example of a tool box according to the disclosed technology in the deployed position.

In another example shown in FIG. 8, one or more steps 312 are operationally mounted to the underside of truck bed 304. When tool box 300 is in the deployed position on deployment mechanism 310, step 312 may be automatically or manually deployed from beneath truck bed 304. The number, size, and height of step 312 may vary according the particular configuration of truck, truck bed, tool box, and deployment mechanism. When finished, step 312 may be stowed back under truck bed 304.

Figure 9:
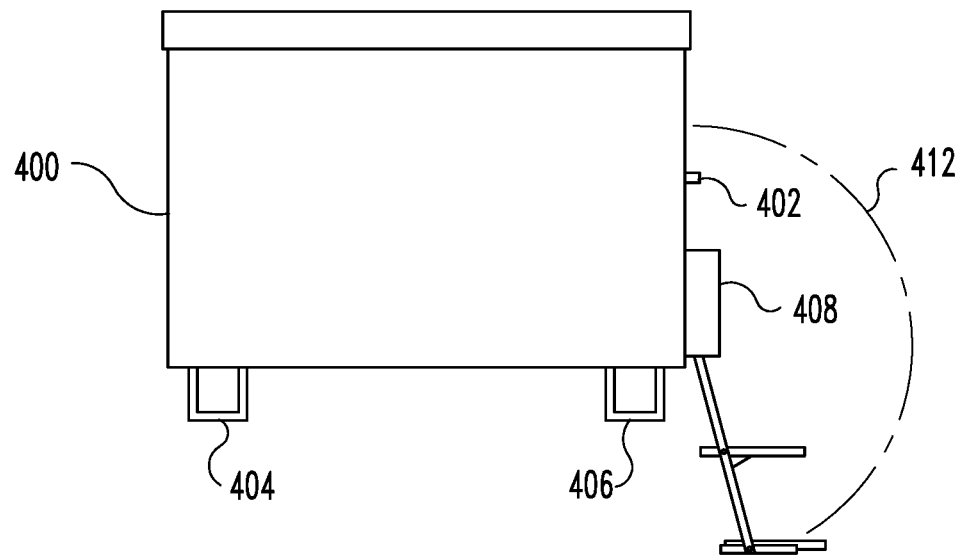
FIG. 9 is a side view of a tool box according to the disclosed technology with deployed steps.
Figure 10:
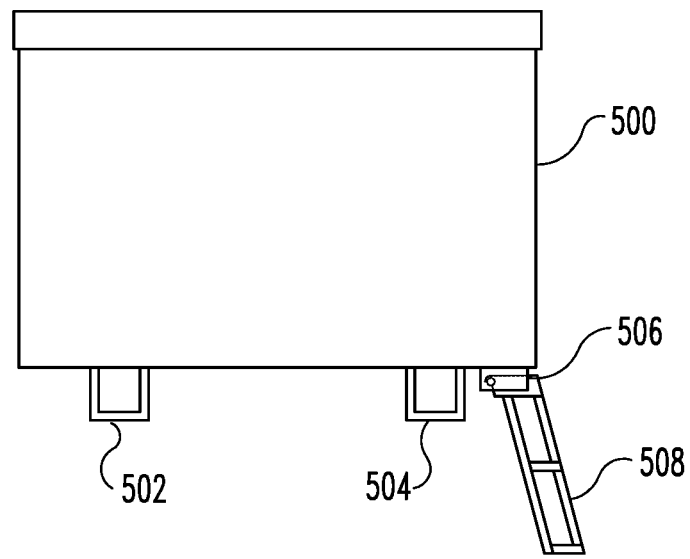
FIG. 10 is a side view of a tool box according to the disclosed technology with deployed steps.

Other examples of steps for use with the disclosed technology are shown in FIGS. 9-10. In the example shown in FIG. 9, tool box 400 mounted to pair of slides 404, 406 has bracket 408 mounted to one side. Bracket 408 includes pivotably mounted stairs 410 which are movable 412 between a lowered, useable position (shown) and a raised, storage position (not shown). When in the stowed position stairs 410 are secured to latch 402 mounted to the side of tool box 400. Optionally a tool box may include more than one set of stowable steps and/or may have steps mounted to the side of the tool box. As shown in FIG. 10, tool box 500, mounted to pair of slides 502, 504, includes bracket 506 mounted to the underside of tool box 400 such that it does not interfere with the operation of slides 502, 504 or any other part of the deployment mechanism. Set of steps 508 is removably mounted to bracket 506 such that they may be attached to bracket 506 when needed and removed and stowed in the truck or in the tool box when not needed.

Figure 11:
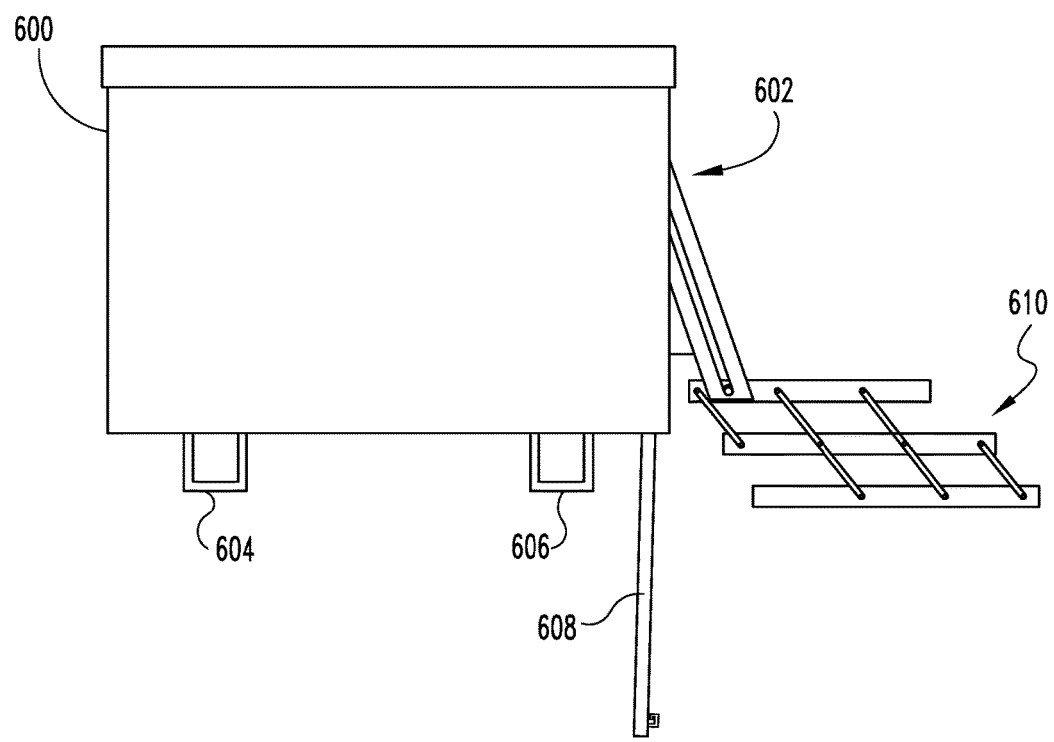
FIG. 11 is a side view of a tool box according to the disclosed technology with deployed storage trays.

FIG. 11 shows yet another example of the disclosed technology. In this example, tool box 600 mounted to pair of slides 604, 606 includes one or more side panels 608 which are movable to expose the interior of tool box 602. In this example, panel 608 swings downward, but alternatively panels may swing upward, slide sideways, or be removable. Once the interior is exposed, one or more tool or storage trays 610 may slide downward and outward such that they may be accessed by a user standing on the ground without the need of a step. When finished, the user may fold trays 610 back up into tool box 600 and close panel 608 to secure the tool box closed.

Figure 12:
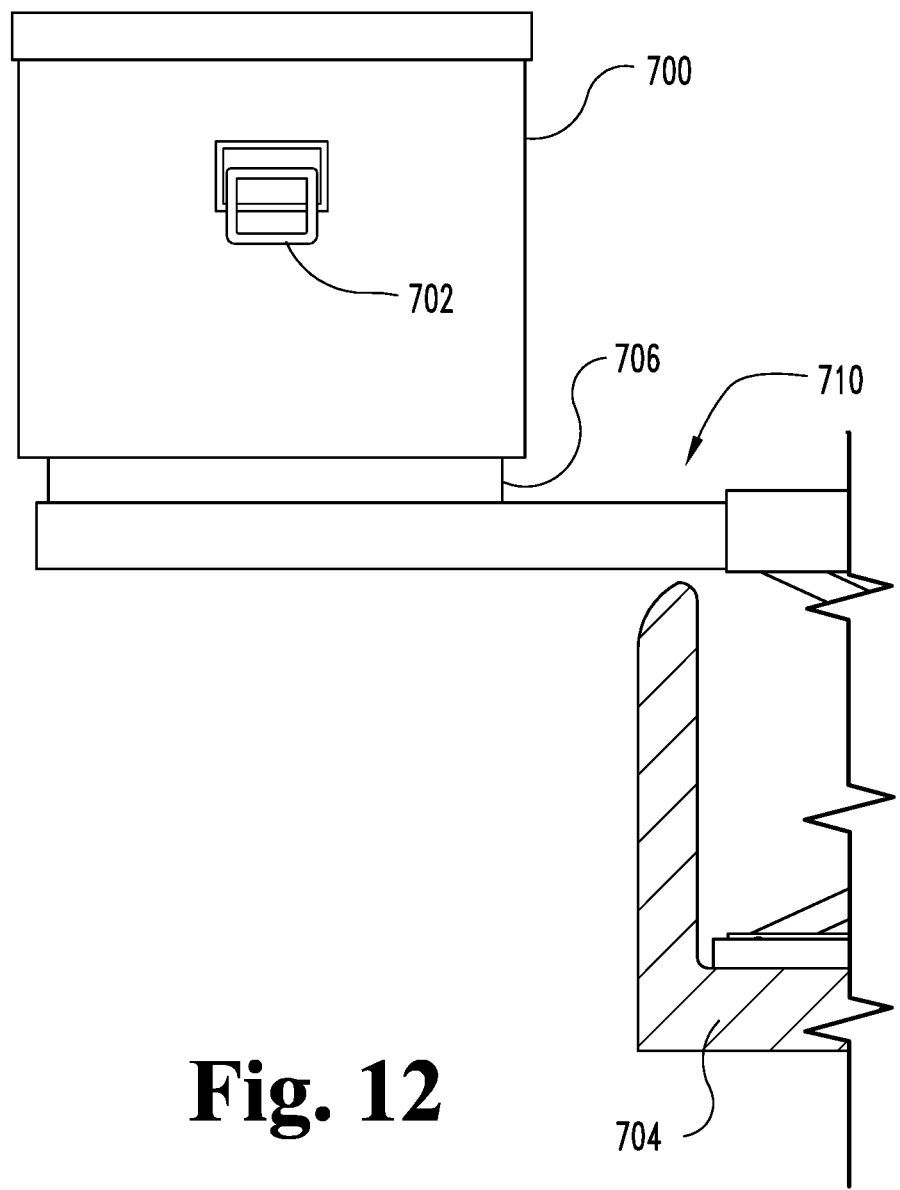
FIG. 12 is a side view of a tool box according to the disclosed technology with the tool box deployed and rotated.
Figure 13:
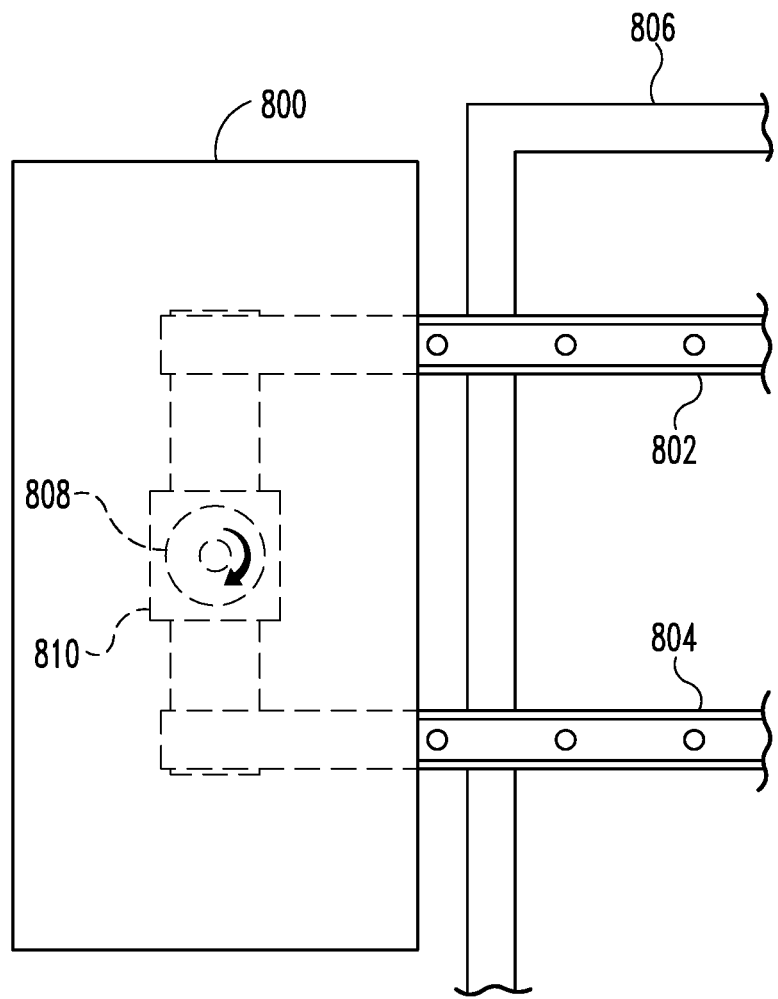
FIG. 13 is a top plan view of the tool box after being deployed and rotated.

A further embodiment of the invention is shown in FIGS. 12 and 13. In these embodiments, deployment mechanism 710 includes rotary pivot 706 upon which tool box 700 is mounted. Rotary pivot 706 allows the rotation of tool box 700 so that tool box 700 may be arranged at any angle relative to deployment mechanism 710, and also relative to truck bed 704. Rotary pivot 706 may be a simple rotation hub with a lock, so that when the truck is in motion tool box 700 is rotationally fixed but when unlocked tool box 700 may be positioned in any convenient rotational position. Alternatively, rotational pivot 706 may have a mechanical driver to controllably rotate tool box 700, which control may be incorporated into the control of deployment mechanism 706 or may be separate and distinct. Tool box 700 may be releasably attached to rotary pivot 706, so that in transport tool box 700 remains attached to deployment mechanism 710 (presumably within truck bed 704). When released, tool box 700 may be manually lifted by handles 702. In FIG. 12, slide rails 802, 804 are shown extending support member 808 and rotary pivot 810 so that toolbox 800 may be put in a range of angular positions relative to truck bed 806.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed:
1. An assembly for supporting a tool box on a walled bed, the assembly including:
   a base configured to support a tool box;
   a lifting mechanism connected to the base and capable of extending the base upwards above a wall;

a lateral mechanism connected to the base and capable of extending the base from the wall; and a pivot mechanism associated with the base and adapted to rotatably position the tool box.

2. The assembly of claim 1 further comprising a first step attached to the base.

3. The assembly of claim 2 further comprising at least one further step connected to the first step.

4. The assembly of claim 1 wherein the lifting mechanism includes a scissor-lift mechanism.

5. The assembly of claim 4 wherein the scissor-lift mechanism includes a pair of cross members.

6. The assembly of claim 1 wherein the lateral mechanism includes a slide bracket.

7. The assembly of claim 6 wherein the lateral mechanism includes a second slide bracket.

8. The assembly of claim 6 wherein the slide bracket includes a plurality of wheels.

9. The assembly of claim 8 wherein the wheels are comprised of metal.

10. The assembly of claim 9 wherein the metal is one of aluminum and steel.

11. The assembly of claim 1 further comprising a slide panel adapted to allow the movement of a tool box shelf from the interior of the tool box to a position on the slide panel.

* * * * *